US007918260B2

(12) United States Patent
Spirito et al.

(10) Patent No.: US 7,918,260 B2

(45) Date of Patent: Apr. 5, 2011

(54) UNIT FOR APPLYING ADHESIVE LABELS TO A CONTINUOUS STRIP

(75) Inventors: Gilberto Spirito, Bologna (IT); Andrea Biondi, Bologna (IT)

(73) Assignee: G.D. S.p.A. (IT)

(*) Notice: Subject to any disclaimer, the term of this patent is extended or adjusted under 35 U.S.C. 154(b) by 153 days.

(21) Appl. No.: 12/320,075

(22) Filed: Jan. 16, 2009

(65) Prior Publication Data

US 2009/0242136 A1 Oct. 1, 2009

(30) Foreign Application Priority Data

Jan. 17, 2008 (IT) .............................. BO2008A0026

(51) Int. Cl.

*B26D 5/26* (2006.01)
*B29C 65/48* (2006.01)
*B32B 41/00* (2006.01)

(52) U.S. Cl. ........ 156/353; 156/354; 156/355; 156/361; 156/366; 156/367; 156/368

(58) Field of Classification Search ................. 156/351, 156/353, 354, 355, 361, 366, 367, 368, 510, 156/552, 584

See application file for complete search history.

(56) References Cited

U.S. PATENT DOCUMENTS

| | | | | |
|---|---|---|---|---|
| 4,300,676 A | | 11/1981 | Focke | |
| 5,405,482 A | * | 4/1995 | Morrissette et al. | 156/364 |
| 5,593,749 A | * | 1/1997 | Instance | 428/40.1 |
| 7,014,729 B2 | * | 3/2006 | Grabau et al. | 156/290 |
| 7,176,799 B1 | * | 2/2007 | Golicz et al. | 340/572.1 |
| 2006/0249258 A1 | * | 11/2006 | Painter et al. | 156/541 |
| 2008/0093834 A1 | * | 4/2008 | Hunt | 281/3.1 |

* cited by examiner

*Primary Examiner* — George R Koch, III

(74) *Attorney, Agent, or Firm* — Timothy J. Klima; Shuttleworth & Ingersoll, PLC

(57) ABSTRACT

Adhesive labels are applied to a continuous strip by a unit fed with a first continuous strip of wrapping material advancing along a first path, and a second continuous strip of backing material presenting a succession of labels and advancing along a second path. The labels are detached singly from the second strip by a diverter blade placed along the second path and presenting a sharp edge over which the backing strip is routed through an acute angle to induce the separation of the labels. The unit comprises an aspirating first drum rotating substantially in contact with the edge of the diverter blade at an angular velocity greater than the linear velocity of the second strip, so as to increase the distance between successive transferred labels, and a second drum around which the first strip is looped in such a way that it can be offered to the first drum; the first and second drums rotate tangentially one to another and at the same angular velocity through a point of mutual tangency coinciding with the point at which the labels are transferred from the first drum to the first continuous strip.

14 Claims, 2 Drawing Sheets

UNIT FOR APPLYING ADHESIVE LABELS TO A CONTINUOUS STRIP

BACKGROUND OF THE INVENTION

The present invention relates to a unit for applying adhesive labels to a continuous strip.

More particularly, the present invention finds use in cigarette packers and discloses a unit for the application of adhesive labels, spaced part at a predetermined pitch, to a continuous strip of wrapping material that will be divided ultimately into single leaves suitable for enveloping groups of cigarettes.

By way of example, U.S. Pat. No. 4,300,676 discloses a packet of cigarettes having an inner wrapper of metal foil paper furnished with an adhesive label, which the user removes to gain access to the cigarettes.

Adhesive labels are fed to the cigarette packer generally on a backing strip of silicone-coated material, decoiling from a roll; the labels are stuck to this same strip in a substantially continuous succession. The cigarette packer comprises a detach and transfer station at which the silicone-coated backing strip is routed over the sharp edge of a diverter element, thus causing the single labels to separate by degrees from the backing strip.

The adhesive labels, positioned with the adhesive face directed toward the strip of wrapping material, are induced to stick to the surface of this same material by a jet of pressurized air released intermittently from a nozzle located downstream of the aforementioned diverter element.

One drawback encountered with this solution is that it betrays a total lack of precision in positioning of the label on the continuous strip, given that when in flight, during the transfer step, the label is not fully under control when exposed to the force of the air jet and in effect remains completely free of any restraint.

A second type of unit for applying adhesive labels to a continuous strip of wrapping material functions by directing the silicone-coated backing strip over a diverter element positioned facing the continuous strip to which the label will be applied.

The label detached from the backing strip comes to rest on the continuous strip of wrapping material, advancing beneath the diverter element; a pressure roller located downstream of the diverter element then pinches the label against the continuous strip, causing it to stick progressively to the wrapping material. In both cases, the silicone-coated backing strip is fed toward the diverter element intermittently.

Bearing in mind that the labels are spaced apart on the backing strip by a distance less than the distance at which they will be applied to the strip of wrapping material (one label per single wrapper), the linear velocity at which the strip of wrapping material advances, and therefore the tangential velocity of the pressure roller, will be greater than that of the backing strip.

Consequently, the adhesive label detached from the silicone-coated backing strip is subjected by the pressure roller to a tensioning action that can cause it to be torn or otherwise damaged.

Accordingly, the object of the present invention is to provide a unit for applying adhesive labels to a continuous strip, such as will be unaffected by the drawbacks mentioned above and capable of high speed operation.

SUMMARY OF THE INVENTION

The stated objects are substantially realized in a unit according to the present invention for applying adhesive labels to a continuous strip. The unit is in receipt of a first continuous strip of wrapping material advancing along a first feed path, also a second continuous strip of backing material advancing along a second feed path and presenting a plurality of adhesive labels to be transferred to the first continuous strip, and equipped with a diverter element placed along the second feed path, presenting a sharp edge and interacting with the second strip in such a way as to detach the labels in succession from the selfsame second strip.

The unit further comprises a first conveying drum positioned downstream of the diverter element and substantially in contact with the sharp edge presented by the selfsame element, designed to take up and convey the labels detached from the second strip, and a second conveying drum rotating substantially tangential to the first conveying drum, over which the first strip is looped in such a way that it can be offered directly to the first conveying drum.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
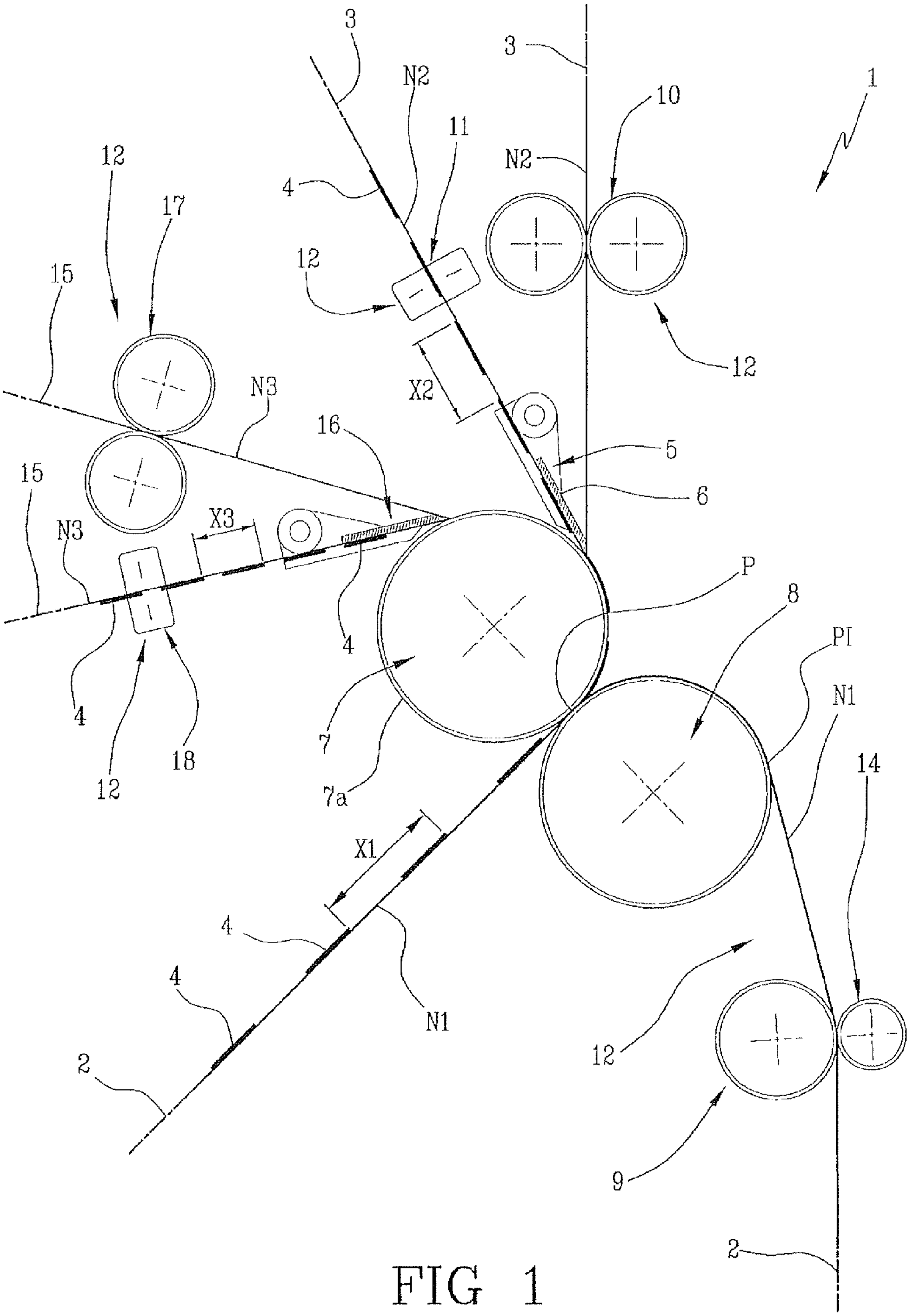
FIG. 1 shows a unit for applying adhesive labels to a continuous strip in accordance with the present invention, illustrated schematically and with certain parts omitted better to reveal others.

With reference to FIG. 1, numeral 1 denotes a unit embodied in accordance with the present invention, in its entirety, for applying adhesive labels to a continuous strip.

The unit 1 finds application to advantage in machines for manufacturing tobacco products, and particularly, in a cigarette packer.

The unit 1 is in receipt of a first continuous strip N1 of wrapping material directed along a first feed path 2, and a second continuous strip N2 of silicone-coated backing material directed along a second feed path 3.

The first strip N1 is divided up into discrete lengths, or leaves, each serving to envelop a group of cigarettes and functioning as the main wrapper for a cigarette packet of soft type, or the inner wrapper for a cigarette packet of rigid type.

The second strip N2, decoiled from a respective roll (not illustrated), provides the backing material for a plurality of labels 4 ordered in succession at a predetermined pitch denoted X2 in FIG. 1, which will be transferred ultimately to the first strip N1, decoiled likewise from a respective roll (not illustrated). The labels 4 might function, for example, as a seal by means of which to secure the wrapper enveloping the group of cigarettes.

The first feed path 2 and the second feed path 3 will incorporate idle rollers (not illustrated) serving to ensure that the respective continuous strips are correctly tensioned.

The unit 1 comprises a diverter element 5 stationed along the second feed path 3 and furnished with a sharp edge interacting with the second strip N2 in such a way as to detach the labels 4 one by one in conventional manner. In particular, the diverter element 5 appears as a blade 6 with an extremity of wedge profile presenting the aforementioned sharp edge.

Importantly, and unlike other prior art solutions, the second strip N2 advances continuously, so that the labels 4 are supplied to the diverter element 5 likewise continuously.

As discernible from FIG. 1, the unit 1 comprises a first conveying drum 7 positioned immediately downstream of the diverter element 5, substantially in contact with the sharp edge aforementioned, by which the labels 4 detached from the silicone-coated backing strip N2 are taken up and carried forward.

More precisely, the expression "substantially in contact" is adopted to emphasize the fact that the sharp edge of the diverter element 5 operates in the immediate vicinity of the first conveying drum 7, at a distance such as to admit the passage only of the second backing strip N2 and the associated adhesive labels 4 between the diverter element 5 and the conveying drum 7. Accordingly, "substantially in contact" is not intended to mean in direct physical contact, but rather, in very close proximity (a few millimeters, for example).

In particular, the first drum 7, which turns at a tangential velocity different to (in this instance greater than) the linear velocity of the advancing second strip N2, will take up the labels 4 from the tip of the diverter element 5 and convey them to a point P of application to the first strip N1. To this end, the first drum 7 rotates tangentially to the wedge profile of the diverter element 5 and on the side of the backing strip N2 bearing the labels 4.

In this way, the labels 4, once separated from the silicone-coated backing strip N2, are intercepted immediately by the first drum 7 and retained on its surface of revolution.

In practice, the difference between the linear feed velocity of the second strip N2 and the tangential velocity of the drum 7 causes rubbing contact between drum and labels when the labels are transferred from the strip N2 to the drum 7, consequently changing the distance between one label and the next on the first strip N1. In the example illustrated, the pitch X2 of the labels on the second strip N2 increases to a longer pitch X1 on the first strip N1. The longer pitch X1 coincides with the length of the leaves cut from the first strip N1, in which the aforementioned groups of cigarettes will be wrapped.

In addition, and in accordance with the foregoing description, the single label 4 enters into contact with the first drum 7 by way of its non-adhesive surface, whilst the adhesive surface of the label 4 is directed away from the drum 7; advantageously therefore, the outer surface 7*a* of the selfsame first drum 7 presents a plurality of aspirating holes (not illustrated), of which the function is to retain the labels 4 conveyed on the drum 7 by the force of suction.

The unit 1 further comprises a second conveying drum 8, disposed substantially tangential to the first drum 7, around which the first strip N1 is looped in such a way that it can be offered to the adhesive face of the labels 4 detached from the second strip N2.

The second drum 8, which rotates at the same speed as the first drum 7 but in the opposite direction, is designed also to advance the first strip N1 at a predetermined decoil velocity SV1 dictated by the number of labels 4 that must be applied per unit of time.

In particular, the first continuous strip N1 meets the second drum 8 initially at a point PI upstream of the point P at which the labels 4 are applied, this also being substantially the point of mutual tangency between the two drums 7 and 8, and leaves the second drum 8 immediately downstream of the application point P. Thus, the first strip N1 is positioned to receive the labels 4, and the labels are affixed to the strip N1. The combined action of the two drums 7 and 8 at the point P of mutual tangency produces a compressive force that will ensure the labels 4 stick faultlessly to the first strip N1.

The unit also comprises a device 9 operating along the first feed path 2 upstream of the point P at which the labels 4 are applied, and preferably upstream of the point PI where the first strip N1 meets the second drum 8, serving to apply reference marks to the strip N1.

The marker device 9 can be a printer or a notch cutter, or a combination of both, depending on the type of cigarette packer in which the unit 1 is installed.

The marker device 9 applies the aforementioned reference marks at a pitch, denoted X1 in FIG. 1, corresponding to the pitch (the distance, as measured along the first strip N1) at which the labels 4 will be spaced one from the next.

The unit 1 also comprises a drive 10 operating on the second feed path 3 and serving to decoil the second strip N2, that is to say the silicone-coated backing strip bearing the labels 4.

The second continuous strip N2 is advanced by the decoil drive 10 continuously, that is to say, without pause, at a velocity SV2 dictated by the number of labels 4 that must be applied per unit of time.

The backing strip N2 therefore continues to advance throughout the interval between the detachment of one label 4 and the next from the selfsame strip.

To detect the distance between two successive labels 4 presented by the second strip N2, the unit 1 comprises a sensor component 11 operating on the second feed path 3 and able thus to monitor the passage of the labels 4.

Since the distance between two successive labels 4 (denoted X2 in FIG. 1) does not necessarily coincide with the pitch X1 at which the labels must be applied to the first strip N1, the decoil drive 10 will cause the second strip N2 to advance at a linear velocity SV2 different to the decoil velocity SV1 of the first strip N1.

In order to ensure that the frequency with which the labels 4 are separated from the second strip N2 matches the frequency with which the labels 4 are applied to the first strip N1, the unit 1 comprises a timing control device 12.

In particular, the function of the timing control device 12 is to regulate the frequency with which the labels 4 are detached from the second strip N2, according to the pitch X1 at which the selfsame labels 4 must be applied to the first strip N1.

Figure 2:
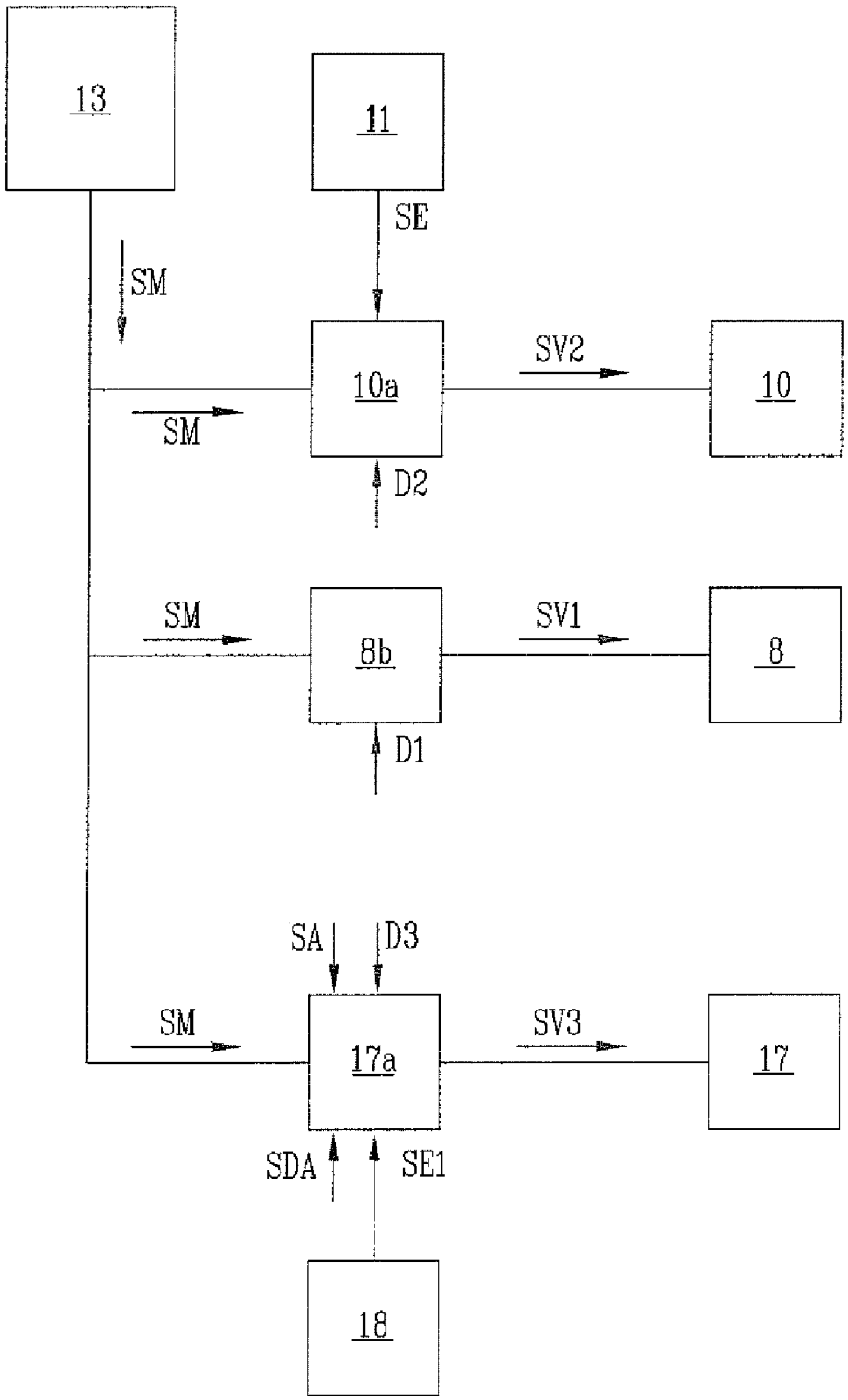
FIG. 2 is a block diagram illustrating certain components of the unit for applying adhesive labels to a continuous strip, in accordance with the present invention.

To this end, as illustrated in the block diagram of FIG. 2, the timing control device 12 comprises a virtual master 13 connected operationally to a control component 8*b* of the second conveying drum 8 and to a control component 10*a* of the decoil drive 10 feeding the second strip N2.

A signal SM is sent by the virtual master 13 both to the control component 8*b* of the second conveying drum 8 and to the control component 10*a* of the decoil drive 10.

The signal SM generated by the virtual master 13 is a function of the pitch X1 at which the labels 4 must be applied to the first strip N1.

The signal SM is processed and interpreted by the control component 8*b* of the second conveying drum 8, which sets the drum in rotation at the decoil velocity SV1 aforementioned.

The control component 10*a* of the decoil drive 10 also receives a signal SE representing the passage of the labels 4 along the second feed path 3.

This signal indicates the pitch X2 at which consecutive labels are placed on the second strip N2.

The control component 10*a* of the decoil drive 10 processes and compares the signals SM and SE and activates the drive at the velocity SV2 mentioned previously.

In other words, the signal SM sent by the virtual master 13 is recognized by the control component 10*a* of the decoil drive 10 as a signal indicating the pitch X1 at which the labels 4 are to be applied to the first strip N1 and, comparing this value with the pitch X2 at which successive labels are positioned on the second strip N2, the control component 10*a* is able to determine the appropriate decoil velocity SV2 of the second strip N2, in order to ensure that the supply of labels to the first conveying drum 7 is timed correctly for their subsequent application to the first strip N1.

In this way, given the distance X2 between two consecutive labels 4 presented by the second strip N2 (detected by the sensor component 11) and the pitch X1 at which the labels must be applied to the first strip N1 (determined by the signal SM received from the virtual master 13), the control component 10*a* of the decoil drive 10 will increase or reduce the linear feed velocity of the second strip N2.

In particular, in the event of an increase in the pitch X1 at which the labels need to be applied to the first strip N1, and/or an increase in the distance X2 between two successive labels 4 presented by the second strip N2, the control component 10*a* will cause the decoil drive 10 to reduce the decoil velocity SV2 of the second strip N2.

Conversely, in the event of a reduction in the pitch X1 at which the labels are to be applied to the first strip N1, and/or a reduction in the distance X2 between two successive labels 4 presented by the second strip N2, the control component 10*a* causes the decoil drive 10 to increase the decoil velocity SV2 of the second strip N2.

The signal SM generated by the virtual master 13 is also a function of the speed with which the labels 4 are be applied to the first strip N1.

In other words, the signal SM generated by the virtual master 13 also contains information relating to the frequency with which the labels 4 are applied to the first strip N1.

Accordingly, both the control component 8*b* of the second drum 8 and the control component 10*a* of the decoil drive 10 process this information, so that the first strip N1 and the second strip N2 will also be decoiled according to the frequency (or the speed) with which the labels 4 are applied to the first strip N1.

In the preferred embodiment illustrated, the marker device 9 comprises a cutter 14 designed to notch the first strip N1 at regular intervals (coinciding generally with the pitch X1 at which the labels will be applied to this same first strip N1) in such a way as will facilitate the division of the continuous strip N1 bearing the labels 4 into discrete lengths, or leaves, each presenting one or more labels (in general, one label only).

The marker device 9, like the components mentioned previously, is interlocked to the virtual master 13 and in receipt of the signal SM (FIG. 2).

The signal SM is processed by the marker device 9 and used to pilot the operation of the cutter 14 at the required frequency.

The distance between the cutter 14 and the point P at which the labels are applied is denoted D1 in FIG. 2; this distance is predetermined and known beforehand.

The distance along the second feed path 3 between the sensor component 11 and the point P at which the labels 4 are applied, denoted D2 in FIG. 2, is likewise predetermined and known beforehand.

When processing the signal SM received from the virtual master 13, the control components 8*b* and 10*a* will also take account of the distances D1 and D2 aforementioned, as shown schematically in FIG. 2.

This allows the application of the labels 4 to the first strip N1 not only at the required pitch X1 but also in predetermined positions on the strip, for example at a certain distance from the notches made by the cutter 14.

The unit 1 further comprises a third feed path 15 along which to advance a third continuous strip N3 presenting a succession of labels 4, and a further diverter element 16 located along the selfsame third feed path, interacting with the third strip N3 in such a way as to detach the labels 4 one by one.

The diverter element 16, located in close proximity to the first drum 7, is similar in all respects to the diverter element 5 first mentioned, and stationed preferably upstream of the first diverter element 5.

The third strip N3 is decoiled from a roll and drawn toward the drum by a relative drive 17 installed along the third feed path 15.

Also installed along the third feed path 15 is a sensor component 18 serving to monitor the passage of the labels 4.

As mentioned previously with reference to the second feed path, the distance between two successive labels 4 (denoted X3 in FIG. 1) presented by the third strip N3 does not necessarily coincide with the pitch X1 at which the labels must be applied to the first strip N1; consequently, the decoil drive 17 will cause the third strip N3 to advance at a linear velocity SV3 different to the decoil velocity SV1 of the first strip N1.

Advantageously, the third feed path 15, and in particular the third continuous strip N3, will come into use only when labels 4 cease to be supplied to the first roller 7 along the second feed path 3.

This break in supply might be attributable, for example, to the fact that the roll from which the second strip N2 decoils has been fully depleted, or that the second strip N2 has been detected as missing one or more labels 4.

The third feed path 15, and in particular the third continuous strip N3, will be deselected the moment the interruption ceases, or in practice, as soon as the second strip N2 is reinstated and the supply of labels 4 to the diverter element 5 along the second feed path is resumed.

Thus, the operation of the unit for applying labels to the continuous strip N1 is guaranteed never to be affected by breaks in continuity.

To this end, as shown schematically in FIG. 2, the decoil drive 17 for the third strip N3 is brought into operation by a relative activating signal SA.

The signal SA activating the decoil drive 17 is generated whenever the sensor element 11 ceases to generate the aforementioned signal SE indicating the passage of the labels 4 along the second feed path 3.

In addition, a deactivating signal SDA is generated and sent to the decoil drive 17 the moment that the signal SE indicating the passage of a label 4 along the second feed path 3 is restored.

When the third feed path 15 is brought into use, its operation is identical to that of the second feed path 3 described previously.

In particular, the virtual master 13 sends the signal SM to a control component 17*a* of the decoil drive 17 in the same way as already described with reference to the control component 10*a* of the decoil drive 10 for the second strip N2.

Similarly, the sensor component 18 supplies the control component 17*a* with signals SE1 indicating the passage of labels 4 along the third feed path 15.

The control component 17*a* is also programmed to identify the distance D3 (FIG. 2) along the third feed path 15 between the sensor component 18 and the point P at which the labels 4 are applied to.

In this way, given the distance X3 between two consecutive labels 4 presented by the third strip N3 (detected by the sensor component 18) and the pitch X1 at which the labels must be applied to the first strip N1 (determined by the signal SM generated by the virtual master 13), the control component 17*a* of the decoil drive 17 will increase or reduce the linear feed velocity of the third strip N3.

In particular, in the event of an increase in the pitch X1 at which the labels must be applied to the first strip N1, and/or an increase in the distance X3 between two successive labels 4 presented by the third strip N3, the control component 17*a* will cause the decoil drive 17 to reduce the decoil velocity SV3 of the third strip N3.

Conversely, in the event of a reduction in the pitch X1 at which the labels need to be applied to the first strip N1, and/or a reduction in the distance X3 between two successive labels 4 presented by the third strip N3, the control component 17*a* will cause the decoil drive 17 to increase the decoil velocity SV3 of the third strip N3.

Moreover, the control component 17*a* of the drive 17 processes the signal SM received from the virtual master 13, so that third strip N3 can also be decoiled according to the frequency (or the speed) with which the labels 4 are applied to the first strip N1.

When processing the signal SM received from the virtual master 13, the control component 17*a* will also take account of the distances D1 and D3 aforementioned, as shown schematically in FIG. 2.

This allows application of the labels 4 to the first strip N1 not only at the required pitch X1 but also in predetermined positions on the strip, for example at a certain distance from the notches made by the cutter 14.

The objects stated at the outset are achieved by the present invention.

With a unit according to the present invention, labels can be applied to a continuous strip of wrapping material at high speed, inasmuch as the labels can effectively be fed to the point of application at any given speed, that is to say, the operating speed is not limited by stops and starts in the motion of the backing strip on which the labels are procured.

Furthermore, the unit according to the invention enables a controlled and precise application of the label to the continuous strip given that there is no difference, one relative to another, in the speeds at which the labels and the continuous strip pass through the point of application. This feature also ensures that the labels will not be damaged during their application to the continuous strip.

Again, given that the point at which the labels are affixed to the first continuous strip also coincides with the point of mutual tangency between the two drums, the unit guarantees optimum adhesion and accurate positioning of the labels.

What is claimed is:

1. A unit for applying adhesive labels to a continuous strip, comprising:

a first continuous strip advancing along a first feed path;

a second continuous strip advancing along a second feed path and including a plurality of adhesive labels to be transferred to the first continuous strip;

a diverter element placed along the second feed path, having a sharp edge and interacting with the second continuous strip to detach the labels in succession from the second continuous strip;

a first conveying drum positioned downstream of the diverter element and substantially in contact with the sharp edge of the diverter element, for taking up and conveying the labels detached from the second continuous strip;

a second conveying drum rotating substantially tangential to the first conveying drum, over which the first continuous strip is looped to be offered to the first conveying drum;

a timing control device for regulating a frequency with which the labels are detached from the second continuous strip, according to a pitch at which the labels are to be spaced one from the next when applied to the first continuous strip;

the timing control device comprising a cutter placed along the first feed path, by which the first continuous strip is marked with notches to indicate points at which the first continuous strip will be divided into discrete lengths, the marks being made by the cutter at regular intervals according to the pitch at which the labels will be applied to the first continuous strip.

2. A unit as in claim 1, comprising a drive by which the second continuous strip is decoiled from a roll, wherein the second continuous strip is decoiled by the drive continuously, and at a velocity different to the decoil velocity of the first continuous strip.

3. A unit as in claim 2, wherein the first conveying drum includes a plurality of aspirating holes arranged around its peripheral surface, for retaining the labels during their transfer from the diverter element to the first continuous strip.

4. A unit as in claim 1, wherein the timing control device comprises a virtual master for piloting operation of the decoil drive for at least one of increasing and reducing the decoil velocity of the second continuous strip.

5. A unit as in claim 4, wherein the virtual master pilots operation of the second drum for at least one of increasing and reducing a decoil velocity of the first continuous strip.

6. A unit as in claim 5, comprising respective control components governing the second drum and the decoil drive, wherein the virtual master qenerates a signal to be processed by the control components for determining the pitch at which the labels must be applied to the first continuous strip, and the control components are piloted respectively to set the second drum in rotation at the required velocity of the first continuous strip and to activate the decoil drive at the required velocity of the second continuous strip.

7. A unit as in claim 6, wherein the timing control device comprises a sensor component operating on the second feed path for monitoring the passage of the labels along the second feed path.

8. A unit as in claim 7, wherein the sensor component provides the control component of the decoil drive with signals indicating the passage of the labels along the second feed path.

9. A unit as in claim 8, wherein the control component of the decoil drive processes the signals for determining a distance between two successive labels.

10. A unit as in claim 9, wherein the control components receive data indicating a distance along the first feed path from the cutter to the point at which the labels are applied, and a distance along the second feed path from the sensor component to the point at which the labels are applied.

11. A unit as in claim 10, comprising a third feed path along which to advance a third continuous strip including a plurality of adhesive labels, also a diverter element installed along the third feed path and interacting with the third continuous strip to detach the labels in succession from the third continuous strip.

12. A unit as in claim 11, comprising a decoil drive by which the third continuous strip is advanced along the third feed path, wherein the decoil drive is brought into operation by an activating signal.

13. A unit as in claim 11, wherein the decoil drive is in communication with the virtual master.

14. A unit for applying adhesive labels to a continuous strip, comprising:

a first continuous strip advancing along a first feed path;

a second continuous strip advancing along a second feed path and including a plurality of adhesive labels to be transferred to the first continuous strip;

a diverter element placed along the second feed path, having a sharp edge and interacting with the second continuous strip to detach the labels in succession from the second continuous strip;

a first conveying drum positioned downstream of the diverter element and substantially in contact with the sharp edge of the diverter element, for taking up and conveying the labels detached from the second continuous strip;

a second conveying drum rotating substantially tangential to the first conveying drum, over which the first continuous strip is looped to be offered to the first conveying drum;

a timing control device for regulating a frequency with which the labels are detached from the second continuous strip, according to a pitch at which the labels are to be spaced one from the next when applied to the first continuous strip;

the timing control device comprising a virtual master for piloting operation of the decoil drive for at least one of increasing and reducing a decoil velocity of the second continuous strip;

the virtual master piloting operation of the second drum for at least one of increasing and reducing a decoil velocity of the first continuous strip.

* * * * *